United States Patent [19]
Christensen

[11] 3,728,970
[45] Apr. 24, 1973

[54] TURNTABLE
[76] Inventor: Robert G. Christensen, R. D. No. 1, Franklin Center Road, Cranesville, Pa. 16410
[22] Filed: May 11, 1970
[21] Appl. No.: 36,165

[52] U.S. Cl. ................................................. 104/44
[51] Int. Cl. .............................................. B60s 13/02
[58] Field of Search ....................... 104/35, 44, 45, 46

[56] References Cited

UNITED STATES PATENTS

| 1,291,747 | 1/1919 | Brain | 104/44 |
| 3,190,475 | 6/1965 | Fischer | 104/46 |
| 3,338,176 | 8/1967 | Petersen | 104/35 |
| 3,536,214 | 10/1970 | Sorg | 104/44 |

Primary Examiner—Gerald M. Forlenza
Assistant Examiner—D. W. Keen
Attorney—Charles L. Lovercheck

[57] ABSTRACT

A turntable for a snowmobile or the like made up of a lower frame having ground engaging legs, an upper frame supported on the lower frame and having an inclined ramp on each end which will engage the ground and form a path up which the snowmobile may climb. The upper frame is covered with expanded metal and has cleats fastened to it.

1 Claim, 1 Drawing Figure

PATENTED APR 24 1973
3,728,970
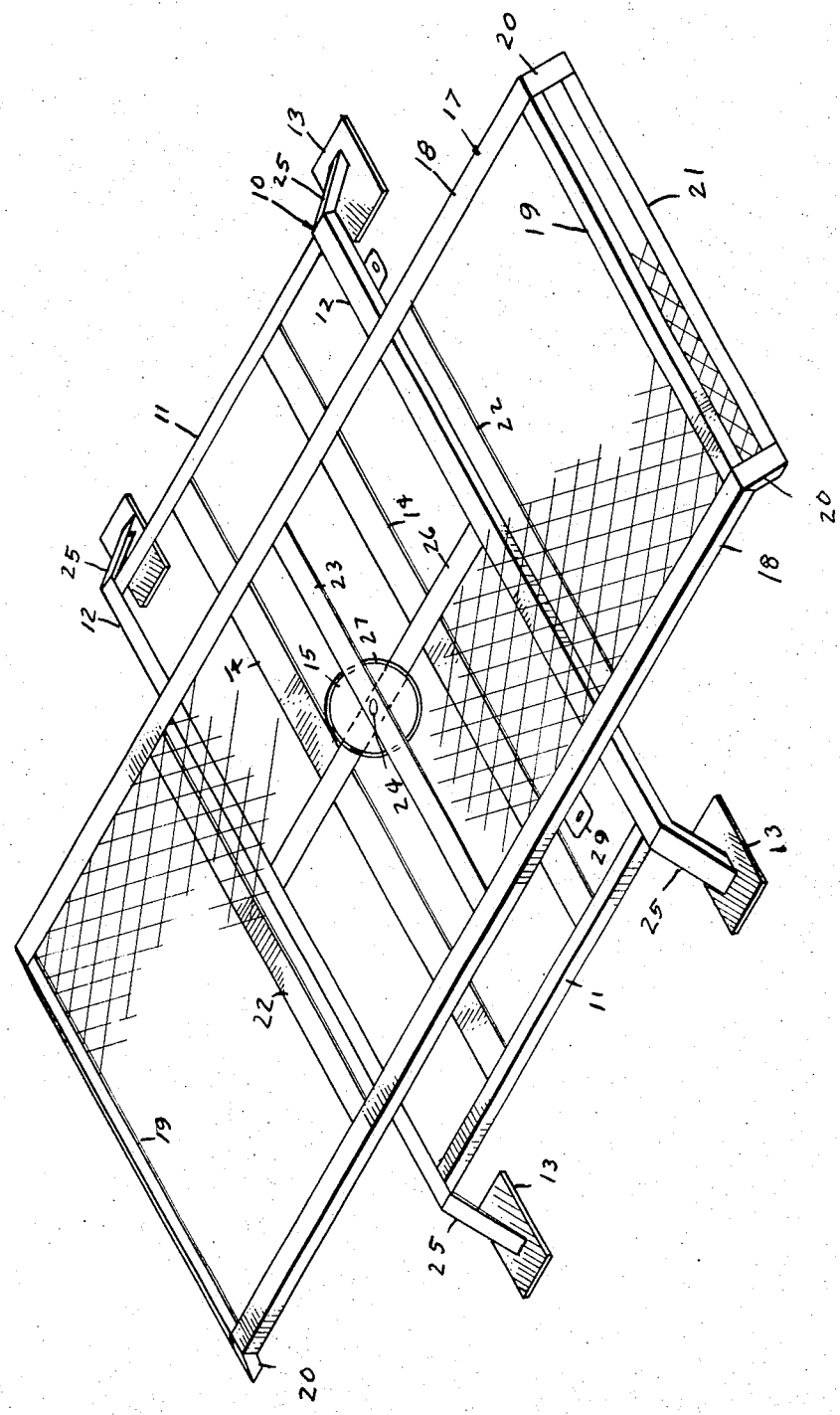
Inventor
Robert G. Christensen
By
Charles L. Lunchal Attorney

TURNTABLE

STATEMENT OF INVENTION

This invention relates to turntables and, more particularly, to turntables suitable for use in driveways, patio enclosures which have a single entrance for turning a snowmobile around.

Snowmobiles frequently have no reverse and are, therefore, difficult to get out of garages, patios and driveways. The snowmobiles can be easily turned around by means of the turntable described herein.

GENERAL DESCRIPTION OF THE INVENTION

The turntable according to the invention, is made up of a lower frame and an upper frame. The frames may be approximately 3 feet wide and approximately 7 feet 6 inches long and 5 ¾ inches in height. They consist of a base, 3 feet × 5 ½ feet × 3 ½ inches in height, which has a table mounted on it that pivots on a center pin and can be locked in either of two positions. On the table, there is an angle lip which extends downwardly at an angle of 20° with cleats on it which enables snowmobile skis to ride up on the table. From this position, the driver is able to unlock the table and turn the table around on the base with fingertip ease. The unit may be anchored securely to the floor or to the truck bed and can be provided with either pads retractable casters which may be bolted to a floor. The expanded metal cover allows meltIng snow to drain off the turntable, keeping the tracks from freezing to the turn table and prolonged life of the snowmobile power track when it is stored out of season. Also, this turntable can be adopted for a hand operated or power lift to raise to work bench height for ease in servicing.

OBJECTS OF THE INVENTION

It is an object of the invention to provide an improved turntable.

Another object is to provide a turntable especially suitable for use with a snowmobile.

GENERAL DESCRIPTION OF THE DRAWINGS

The drawing shows an isometric drawing of the turntable.

DETAILED DESCRIPTION OF THE DRAWINGS

The turntable disclosed herein has a lower frame 10 and an upper frame 17. The lower frame is made up of the lateral members 11 and longitudinal frame members 12. The lateral members 11 are welded to the members 12 and the members 12 extend forwardly and downwardly and terminate in the inclined leg members 25. The platelike pad members 13 are welded to the lower end of the leg members 25 and they may be attached to the ground by suitable pins, bolts or the like.

The intermediate longitudinal members 14 are welded to the lateral members 11 and the lateral central member 26 is welded to the lateral members 12.

The upper frame 17 has longitudinal members 18 and inclined ramp members 20 which incline outwardly and downwardly to from ramp legs. Lateral members 21 are affixed to the distal ends of the ramp legs 20 and lateral members 19 are affixed to the lateral amebers at the top of the ramp. Intermediate lateral members 22 are welded to the longitudinal members 18 and the central member 23 is likewise welded at its ends to the longitudinal members 18.

An upper plate 15 is welded to the lateral member 23 and a lower plate 27 is welded to the lateral member 23 and a pin 24 holds the two dislike palte members together.

The upper frame and lower frame may be rotated 360° relative to each other. They may be rotated to bring the lateral members 18 and the lateral members 12 parallel with each other, in which position they may be fastened together by means of the bolt through tab member, such as tab member 29. They can be rotated perpendicular to each other, then again parallel to reverse the direction the snowmobile is headed.

The foregoing specification sets forth the invention in its preferred practical forms but the structure shown is capable of modification within a range of equivalents without departing from the invention which is to be understood is broadly novel as is commensurate with the appended claims.

The embodiments of the invention in which an exclusive property or privilige is claimed are defined as flollows:

1. A turntable comprising a lower frame generally rectangular in shape and having a part disposed in a plane and having ground engaging legs, an upper frame being rotatably supported on said lower frame, said upper frame being made of two first spaced longitudinally extending frame members connected together by a first, a first intermediate, and a second laterally extending frame member, said lower frame being made of two second spaced longitudinally extending frame members, a second intermediate frame member connecting said second longitudinally extending frame members, an upper plate welded to said first intermediate member on said uper frame and a lower plate welded to said second intermediate member on said lower frame, and a pin extending through said plate members pivotally supporting them together, holding said frame members together, said upper frame member being rotatable approximately 360° on said lower frame member to bring said frame members parallel to each other and parallel in a reverse direction, expanded metal attached to said upper frame members providing a platform thereon, said longitudinally extending frame members being substantially equal in length, downwardly and outwardly inclined legs attached to said lower frame, and platelike feet attached to the ends of said legs whereby said lower frame may be attached to a support and downwardly inclined legs on each end of said upper frame for forming a ramp to bring the snowmobile up.

* * * * *